United States Patent [19]

Lau

[11] Patent Number: 5,784,408

[45] Date of Patent: *Jul. 21, 1998

[54] APPARATUS FOR TRANSMITTING AND/OR RECEIVING DATA AT DIFFERENT DATA TRANSFER RATES ESPECIALLY IN APPLICATIONS SUCH AS DUAL-RATE ETHERNET LOCAL-AREA NETWORKS

[75] Inventor: Hung-Wah Anthony Lau, Los Altos, Calif.

[73] Assignee: National Semiconductor Corporation, Santa Clara, Calif.

[*] Notice: The term of this patent shall not extend beyond the expiration date of Pat. No. 5,541,957.

[21] Appl. No.: 636,095

[22] Filed: Apr. 22, 1996

Related U.S. Application Data

[63] Continuation of Ser. No. 260,150, Jun. 15, 1994, Pat. No. 5,541,957.

[51] Int. Cl.$^6$ ............................................. H04B 3/00
[52] U.S. Cl. ............................................. 375/258; 375/377
[58] Field of Search ............................................. 375/257, 258; 370/84, 85.3; 333/100, 119, 126, 131

[56] References Cited

U.S. PATENT DOCUMENTS

| | | | |
|---|---|---|---|
| 3,936,602 | 2/1976 | Krover | 375/258 |
| 4,764,922 | 8/1988 | Dieter et al. | 333/131 |
| 4,896,349 | 1/1990 | Kubo et al. | 375/257 |
| 5,249,183 | 9/1993 | Wing et al. | 370/69.1 |
| 5,253,249 | 10/1993 | Fitzgerald et al. | 370/24 |
| 5,260,664 | 11/1993 | Graham | 324/522 |
| 5,336,946 | 8/1994 | Segaram et al. | 307/355 |
| 5,357,145 | 10/1994 | Segaram | 327/237 |
| 5,410,188 | 4/1995 | Segaram | 327/237 |

FOREIGN PATENT DOCUMENTS

| | | |
|---|---|---|
| 0567342 | 10/1993 | European Pat. Off. . |
| 0596523 | 5/1994 | European Pat. Off. . |
| 0596648 | 5/1994 | European Pat. Off. . |

OTHER PUBLICATIONS

Bryan, "Pumping up Ethernet, "*Byte* , vol. 18, No. 9, Aug. 1993, pp. 121–126.

Leonard, "FDDI Rides Twisted Pair To The Desktop," *Electronic Design* , 16 Sep. 1993, pp. 85, 86, and 88.

Rosenblatt, "Data Communications," *IEEE Spectrum* , Jan. 1991, pp. 48–51.

Shih et al. "10Mb/s Twisted Pair CMOS Transceiver With Transmit Waveform Pre-equalization," *Procs. IEEE 1991 Cust. Integ. Circs. Conf.* , 12–15 May 1991, pp. 7.3.1–7.3.4.

"Application Notes for the FDDI-TP Interface Modules," application note, bel, Jul. 1993, 1 p.

"10Base-T Dual Isolation and Filter Module," data Sheet, Pulse Engineering, Inc., May 1992, 2 pp.

(List continued on next page.)

*Primary Examiner*—T. Ghebretinsae
*Attorney, Agent, or Firm*—Skjerven, Morrill, MacPherson, Franklin & Friel LLP; Ronald J. Meetin

[57] ABSTRACT

A data-transmitting apparatus contains first and second transmitters, a transmit transformer, and a connecting unit for coupling the transformer to an outgoing twisted-pair cable. The first transmitter filters data to produce outgoing data transmitted to the transformer at a first data rate. The second transmitter transmits outgoing data to the transformer at a different, typically greater, second data rate. A data-receiving apparatus contains first and second receivers, a receive transformer, and a connecting unit for coupling an incoming twisted-pair cable to the receive transformer. The first and second receivers receive incoming data from the secondary winding respectively at the first and second data rates. Incoming data is typically provided along data transfer paths that extend from the receive transformer in a daisy chain manner to the receivers. Data moving at either data rate can be transmitted and received without the need for hot switching in the data paths. Optical cables, including an optical transceiver, can be used with, or in place of, the twisted-pair cables.

42 Claims, 9 Drawing Sheets

OTHER PUBLICATIONS

"DP83223 TWISTER Twisted Pair FDDI Transceiver Device," preliminary data sheet, National Semiconductor, Jul. 1993, pp. 1–10.

"Electromagnetic compatibility for industrial–process measurement and control equipment, Part 3: Radiated electromagnetic field requirements," International Standard, CEI/IEC 801-3, Third Impression, 1992, pp. 1–41 and 2 further pp.

"FDDI–TP Interface Module," data Sheet, Bel, Jul. 1993, 2 pp.

"IEEE Link Task Force Autodetect, Specification for NWay Autodetect," Version 1.0, 10 Apr. 1994, pp. 1–59 and 7 further pp.

*Local Area Network Databook*, National Semiconductor, 1992, pp. vii–viii, 1-3 —1-23, 1-359, 2-34 —2-62, 4-7, and 5-7.

"Low Profile Surface Mount 10Base–T Interface Module," data sheet, Pulse Engineering, Inc., Mar. 1993, 4 pp.

"MAC Paeameters, Physical Layer, Medium Attachment Units and Repeater for 100Mb/s Operation (version 1.0)," Carrier Sense Multiple Access with Collision Detection (CSMA/CD) Access Method and Physical Layer Specifications, Draft Supp. to 1993 version of ANSI/IEEE Doc. 807.3u/d2 Std 802.3, 24 Jul. 1994, pp. i–xviii and 21-1-30-85 and 6 further pp.

"Physical Layer for 100Mb/s Operation (100Base–X)," Carrier Sense Multiple Access with Collision Detection (CSMA/CD) Access Method & Physical Layer Specifications, Draft Supp. to ANSI/IEEE std. 802.3, 1993 Edition, 1994, pp. 1–41.

"Radio Frequency Devices," 47 CFR Ch. 1, Part 15, 1 Oct. 1993, pp. 536–583.

"System Considerations for Multisegment 10Mb/s Baseband Networks (Section 13), Twisted–Pair Medium Attachment Unit (MAU) and Baseband Medium, Type 10BASE–T (Section 14)," IEEE Standards for Local and Metropolitan Area Networks: Supplement to Carrier Sense Multiple Access with Collision Detection (CSMA/CD) Access Method and Physical Layer Specifications, IEEE Std. 802.3i–1990, 8 Mar. 1991, 58 pp.

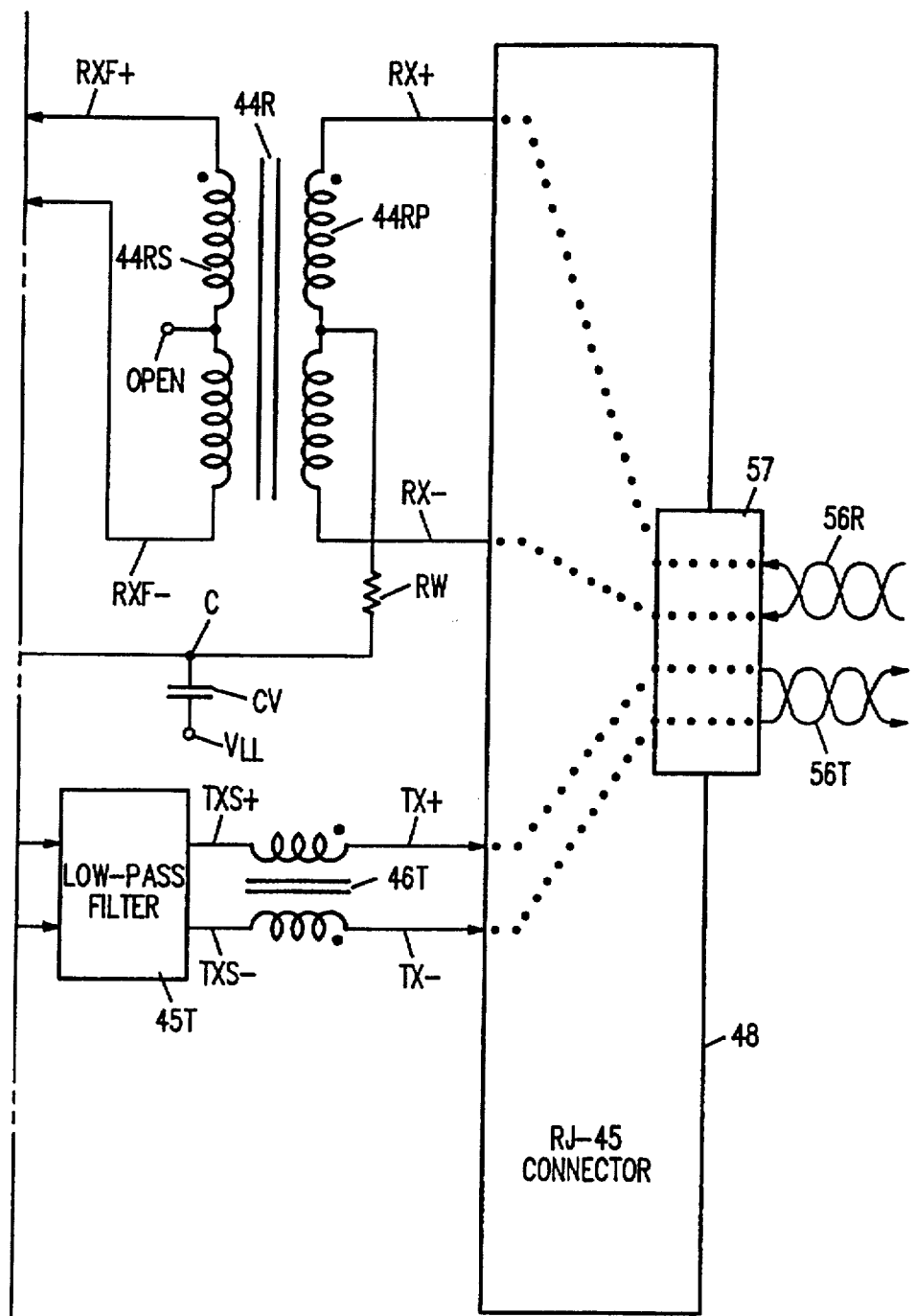
FIG. 2c
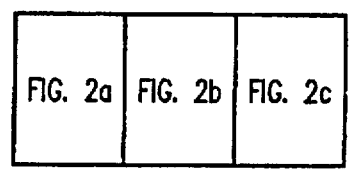
KEY TO FIG. 2

TRANSMIT PATH

RECEIVE PATH

APPARATUS FOR TRANSMITTING AND/OR RECEIVING DATA AT DIFFERENT DATA TRANSFER RATES ESPECIALLY IN APPLICATIONS SUCH AS DUAL-RATE ETHERNET LOCAL-AREA NETWORKS

CROSS REFERENCE TO RELATED APPLICATION

This is a continuation of U.S. patent application Ser. No. 08/260,150, filed 15 Jun. 1994, now U.S. Pat. No. 5,541,957.

FIELD OF USE

This invention relates to devices for transmitting data to, and receiving data from, communication cables. In particular, this invention relates to apparatus suitable for transferring digital data through local-area networks at multiple data transfer rates.

BACKGROUND ART

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation. Information processing equipment made by different suppliers can thus be readily incorporated into the LAN.

The ISO Open Systems Interconnection Basic Reference Model defines a seven-layer model for data communication in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables which are typically more expensive than twisted-pair cables. The 10Base-T protocol of IEEE Standard 802.3 prescribes a rate of 10 megabits/second ("Mbps") for transferring data over twisted-pair cables.

Referring to the drawings, FIG. 1 illustrates a typical example of how a conventional 10Base-T media-access unit ("MAU") interfaces with an outgoing twisted-pair copper cable 10T and an incoming twisted-pair copper cable 10R. The 10Base-T MAU in FIG. 1 is part of a personal computer, a work station, a file server, a bridge, a repeater, or DTE. The MAU consists of an interface controller 12, a 10Base-T transceiver 14, two sets of terminating resistors 16T and 16R, two low-pass filters 18T and 18R, two isolation transformers 20T and 20R, two common-mode chokes 22T and 22R, and an RJ-45 cable connector 24, all situated on an Ethernet adapter card (not indicated). Twisted-pair cables 10T and 10R are part of a larger cable having a plug (not shown) that plugs into RJ-45 connector 24 along an edge of the adapter card.

Interface controller 12 controls the transmission of outgoing data to cable 10T and the reception of incoming data from cable 10R. 10Base-T transceiver 14 converts non-differential outgoing data from controller 12 into differential form represented by signals TXO+ and TXO−. The differential outgoing data moves through resistors 16T, filter 18T, transformer 20T, and choke 22T where, in modified differential form represented by signals TX+ and TX−, the outgoing data is supplied through RJ-45 connector 24 to outgoing cable 10T as a data stream moving at the 10Base-T rate of 10 Mbps.

Before being furnished to outgoing copper cable 10T, the outgoing data is Manchester encoded to reduce electromagnetic interference ("EMI"). The Manchester encoding causes some portions of the data stream to be pulses at 10 MHz while other portions are pulses at 5 MHz. In low-pass filtering the outgoing data, filter 18T typically removes frequency components above approximately 15–20 MHz. This is below the 30-MHz frequency above which the Federal Communications Commission ("FCC") places controls on electromagnetic radiation from unintentional radiators.

Differential incoming data on incoming copper cable 10R is supplied through connector 24 as signals RX+ and RX−. The incoming data passes through choke 22R, transformer 20R, filter 18R, and resistors 16R where, in modified differential form represented by signals RXI+ and RXI−, the incoming data is furnished to transceiver 14 for conversion to non-differential form and transfer to controller 12.

The ever growing need to transfer more information faster, accompanied by increases in data processing capability, is necessitating an expansion to data transfer rates considerably higher than the 10-Mbps rate prescribed by the 10Base-T protocol. As a consequence, a protocol referred to as 100Base-TX is being considered for extending IEEE Standard 802.3 to accommodate data moving at an effective transfer rate of 100 Mbps through twisted-pair cables of presently existing types.

Under the proposed 100Base-TX protocol, certain control bits are incorporated into the data before-it is placed on a twisted-pair cable. The result is that the data and control signals actually move through a twisted-pair cable at 125 Mbps. The 125-Mbps cable rate corresponds to a maximum pulse frequency of 62.5 MHz. Since this exceeds the 30-MHz frequency above which the FCC requires that EMI be controlled, the 100Base-TX protocol specifies that the data be scrambled and provided with a trinary MLT-3 (multilevel transmit/three levels) coding before entering a twisted-pair cable. Although MLT-3 coding has 6 dB less noise immunity than binary coding for equal transmit signal amplitudes, MLT-3 has less conducted power at the key frequencies of 31.25 MHz and 62.5 MHz than binary coding and therefore has less EMI at these frequencies.

In expanding IEEE Standard 802.3 to the 100Base-TX protocol, there will be various situations in which it is desirable that the physical transmission media be capable of handling data transferred through twistedpair cables at both the 100Base-TX rate and the lower 10Base-T rate. Accordingly, a user-friendly apparatus that can transfer data at both rates is needed.

In particular, a person using information processing equipment capable of handling data moving through twisted-pair cables at either the 10Base-T rate or the 100Base-TX rate should not have to throw a switch, or make another such physical adjustment, when the data transfer rate changes from 10Base-T to 100Base-TX and vice versa.

Also, when connecting a twisted-pair cable to data transfer apparatus, the user should not have to make accommodations depending on whether the cable comes from equipment that can handle data moving at the 10Base-T rate, at the 100Base-TX rate, or at both rates. To keep the cost low, it is desirable to use a small number of items such as isolating transformers, which are relatively expensive, and cable connectors in transferring data at both rates.

GENERAL DISCLOSURE OF THE INVENTION

The present invention furnishes an electronic apparatus capable of meeting the foregoing objectives. The apparatus of the invention functions as an interface between (a) electronic equipment capable of transferring data at either of two materially different data transfer rates and (b) twisted-pair cables that carry data to/from other places. The present apparatus is typically used in the physical layer of a LAN.

The present interface apparatus needs only a single pair of isolation transformers for transferring data at the two rates, one of the transformers being used for data transmission at both rates, and the other being used for data reception at both rates. The invention thus employs half as many isolation transformers as would be necessary if a separate isolation transformer were used for each data rate during transmission and for each data rate during reception. This reduces the cost considerably.

Unlike a less sophisticated dual-rate data-transfer apparatus in which one RJ-45 cable connector would be utilized in transferring data at one rate and another RJ-45 connector would be employed in transferring data at the other rate, the interface apparatus of the invention needs only a single cable connector. The invention thereby avoids cable connector multiplexing that would arise from using more than one cable connector. As a result, EMI is reduced.

When unplugging a cable from the present interface apparatus and plugging in another cable that may carry data moving at a different rate, a user does not have to remember or try to figure out which of two cable connectors is to receive the cable. The likelihood of making a wrong hook-up is essentially zero. Also, when the data transfer rate changes from one of the rates to the other, the interface apparatus of the invention automatically adjusts for the change in transfer rate. A user does not have to take any action to help implement the change. In short, the invention is very user friendly.

Moving to the basic architecture of the invention, in one aspect, an electronic apparatus for transmitting data contains a transmit isolation transformer, a connecting unit, a first transmitter, and a second transmitter. The isolation transformer has a primary winding and a secondary winding. The connecting unit is electronically coupled to the secondary winding of the transformer. The connecting unit is also connectable to a pair of lines of an outgoing twisted-pair cable so as to electronically couple the cable to the secondary winding.

The first transmitter low-pass filters digital data to produce outgoing data which is differentially transmitted to the primary winding of the transmit transformer largely at a first data transfer rate. The low-pass filtering is preferably accomplished with the assistance of a digital waveshaper incorporated into the first transmitter. The second transmitter differentially transmits outgoing data to the primary winding largely at a second data transfer rate different from, usually greater than, the first data transfer rate. The transformer isolates the transmitters and associated electronic equipment from other such electronic equipment connected elsewhere to the twisted-pair cable.

Outgoing data streams from the two transmitters have different characteristic data rate frequencies. As used here, the characteristic data rate frequency of a data stream is the frequency corresponding to the minimum attainable width of pulses that represent bits in the data stream. For example, a Manchester-encoded 10Base-T data stream moving at 10 Mbps on a twisted-pair cable has a characteristic data rate frequency of 10 MHz. The characteristic data rate frequency for a 100Base-TX data stream moving at 125 Mbps on a twisted-pair cable is normally 62.5 MHz.

To achieve good operating characteristics and low EMI, frequency components somewhat above the characteristic data rate frequency of the outgoing data from each transmitter should be attenuated in the outgoing data before it is supplied to the twisted-pair cable. The requisite attenuation is achieved with (a) the above-mentioned low-pass filter incorporated into the first transmitter and (b) an additional low-pass filter placed in the data path of outgoing data from the second transmitter.

In the preferred case where the characteristic data rate frequency of outgoing data moving at the second data rate exceeds the characteristic data rate frequency of outgoing data moving at the first data rate, outgoing data from the second transmitter should be low-pass filtered at a greater frequency bandwidth than outgoing data from the first transmitter. In particular, the filter in the first transmitter has a low-pass cut-off frequency in the range extending between the two characteristic data rate frequencies. The additional filter then has a low-pass cut-off frequency greater than or equal to the higher characteristic data rate frequency—i.e., that of the outgoing data provided by the second transmitter.

With the interface apparatus and filtering characteristics arranged in the preceding way, outgoing data provided by the second transmitter at the higher data rate does not pass through the first transmitter's filter and thus is not detrimentally affected by the lower cut-off frequency of the filter in the first transmitter. On the other hand, the additional filter can also be in the data path for outgoing data from the first transmitter. For example, the additional filter can be situated in the secondary winding of the transformer. If so, outgoing data provided by the first transmitter at the lower data rate is low-pass filtered by the filter in the first transmitter and, insofar as filtering is concerned, essentially just passes through the additional filter since its frequency cut-off value exceeds that of the first transmitter's filter. In either case, the net result is that only a single transmit transformer is needed to handle outgoing data moving at both data rates.

A numerical example is helpful in understanding this part of the invention. Consider the case in which the two data transfer rates are the 10-Mbps and 125-Mbps cable rates of the 10Base-T and 100Base-TX protocols so that the characteristic data rate frequencies respectively are 10 MHz and 62.5 MHz. As mentioned above, the 62.5-MHz frequency falls into the regime above 30 MHz where the FCC regulates EMI.

The first transmitter low-pass filters its outgoing data to frequency components above a cut-off frequency between 10 and 62.5 MHz. The cut-off frequency of the filter in the first transmitter is usually between 10 and 20 MHz so that the transmitting apparatus of the invention can meet the 10Base-T protocol. The additional filter attenuates frequency components above a cut-off frequency greater than 62.5 MHz. This does not have any significant filtering effect on outgoing 10Base-T data from the first transmitter since the 10Base-T data is already low-pass filtered at the lower cut-off frequency. Provided that the outgoing data from the second transmitter is suitable encoded to satisfy the FCC limits for electromagnetic radiation from unintentional radiators at frequencies above 30 MHz. the low-pass filtering of the additional filter enables the present transmitting apparatus to meet the 100Base-TX protocol.

In another aspect of the invention, an electronic apparatus for receiving data contains a receive isolation transformer, a connecting unit, a first receiver, and a second receiver. The isolation transformer has a primary winding and a secondary winding. The connecting unit is electronically coupled to the primary winding of the receive isolation transformer. The connecting unit is also connectable to a pair of lines of an incoming twisted-pair cable so as to electronically couple the twisted-pair cable to the primary winding.

The first receiver differentially receives incoming data from the secondary winding of the receive transformer largely at a first data transfer rate. The second receiver differentially receives incoming data from the secondary winding largely at a second data transfer rate. As in the first-mentioned aspect of the invention, the second data rate is different from, usually greater than, the first data rate.

Incoming data from the secondary winding of the receive transformer is provided along data transfer paths that extend from the secondary winding through where one of the receivers physically receives incoming data to where the other receiver physically receives incoming data. The data transfer paths have a characteristic impedance that is largely constant during normal apparatus operation. Typically, incoming data from the secondary winding is provided differentially on a pair of electrical conductors non-interruptibly coupled to both receivers and to the secondary winding. By electronically coupling the receivers in this daisy chain manner, only a single receive transformer is needed to isolate the receivers and associated electronic equipment from electronic equipment electronically coupled elsewhere to the twisted-pair cable.

In a further aspect of the invention, the apparatuses of the first two aspects are combined to form an electronic apparatus capable of both transmitting and receiving data at the two data transfer rates. The first transmitter and first receiver become a first transceiver. The second transmitter and second receiver become a second transceiver. The connecting units described above for data transmission and reception become a single connecting unit connectable to both the outgoing and incoming twisted-pair cables.

The apparatus of the invention in each of the three aspects normally includes circuitry that determines whether data is to be transferred at the lower or higher data rate. The rate circuitry generates a data rate signal indicative of the selected rate. The data rate signal causes data to be automatically channeled through an appropriate data-transfer path in the apparatus. A user can thus connect a twisted-pair cable to the connecting unit without having to take any special action depending on whether the apparatus is connected to equipment that handles data at the lower rate, at the higher rate, or at both rates.

Communication cables besides those of the twisted-pair type can be utilized in the invention. Such cables, which may transmit information by mechanisms other than electrical signals, can be employed in combination with, or as replacements for, the twisted-pair cables. Suitable circuitry interfaces these general data-transmission cables to the transmit and receive transformers.

A typical embodiment according to the invention entails using one or more optical cables. For example, an optical transmitter connectable to an optical cable can be coupled to the transmit transformer without using the connecting unit and outgoing twisted-pair cable. Likewise an optical receiver connectable to an optical cable can be coupled to the receive transformer without using the connecting unit and incoming twisted-pair cable. The optical transmitter and receiver form an optical transceiver that converts electrical energy into optical energy and vice versa. Alternatively, the optical transceiver can be coupled to the twisted-pair cables so that data is transferred over both twisted-pair and optical cables.

Typically, the present apparatus transfers data at the lower rate in accordance with the 10Base-T protocol. Data is transferred at the higher rate in accordance with the 100Base-TX protocol. The apparatus of the invention thereby meets IEEE Standard 802.3 for both 10Base-T and 100Base-TX data transfer.

BRIEF DESCRIPTION OF THE DRAWINGS

FIGS. 2a, 2b, and 2c (collectively "FIG. 2") together constitute a block diagram of an interface transceiver apparatus that meets the 10Base-T and 100Base-TX communication protocols for twisted-pair cables in accordance with the invention.

Like reference symbols are employed in the drawings and in the description of the preferred embodiments to represent the same or very similar item or items. Input and output terminals, where shown in the drawings, are indicated by dark vertical rectangles.

DESCRIPTION OF THE PREFERRED EMBODIMENTS

In the following description, a pair of differential signals means two signals whose voltage or current waveforms are largely complementary (or inverse) to each other. The individual signals of a pair of differential signals are indicated by reference symbols respectively ending with "+" and "−" notation—e.g., S+ and S−. The composite notation "±" is employed to indicate both differential signals using a single reference symbol—e.g., S±. The same convention is employed with paired elements through which differential signals pass.

Figure 1:
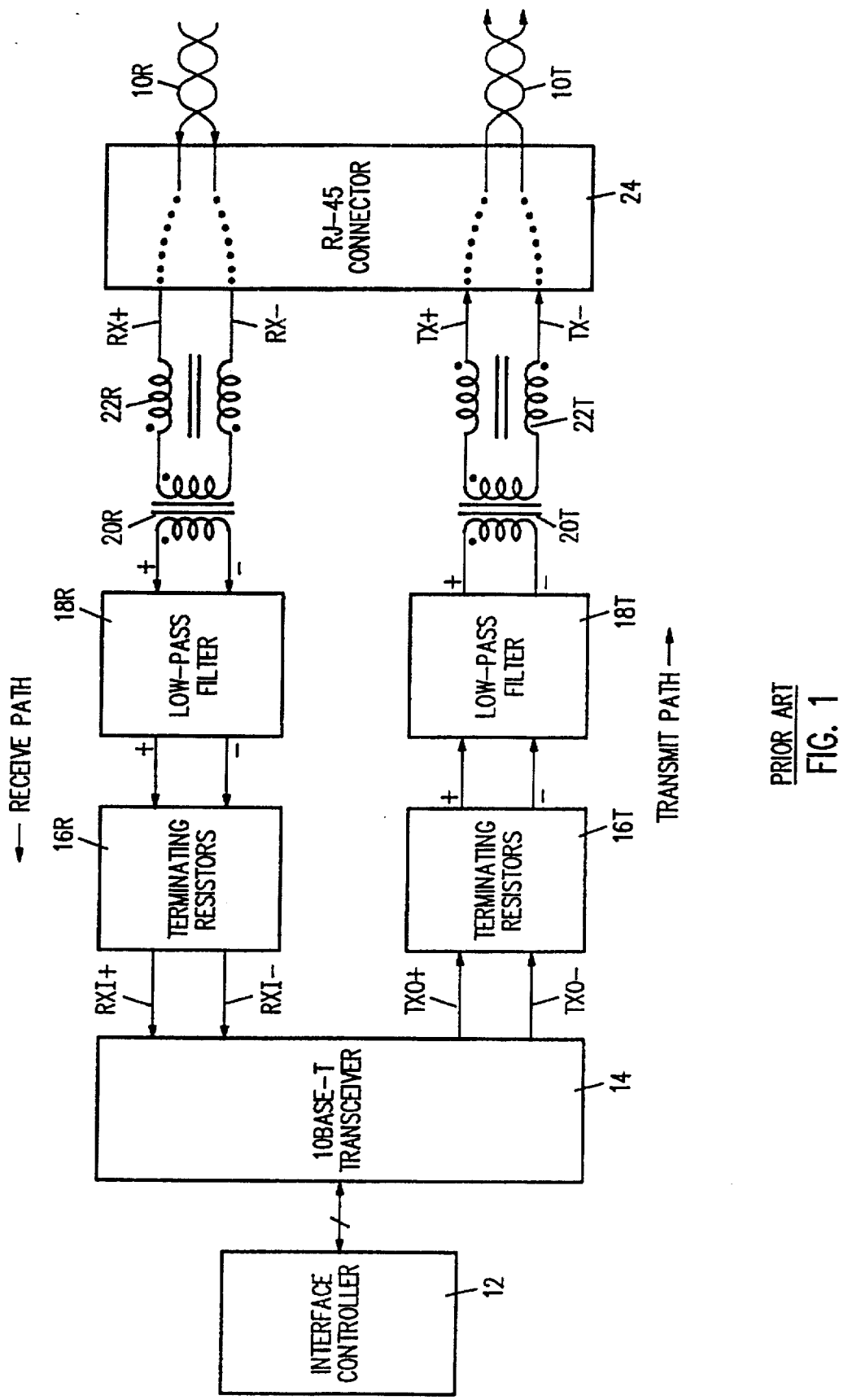
FIG. 1 is a block diagram of a prior art twisted-pair MAU.
Figure 2A:
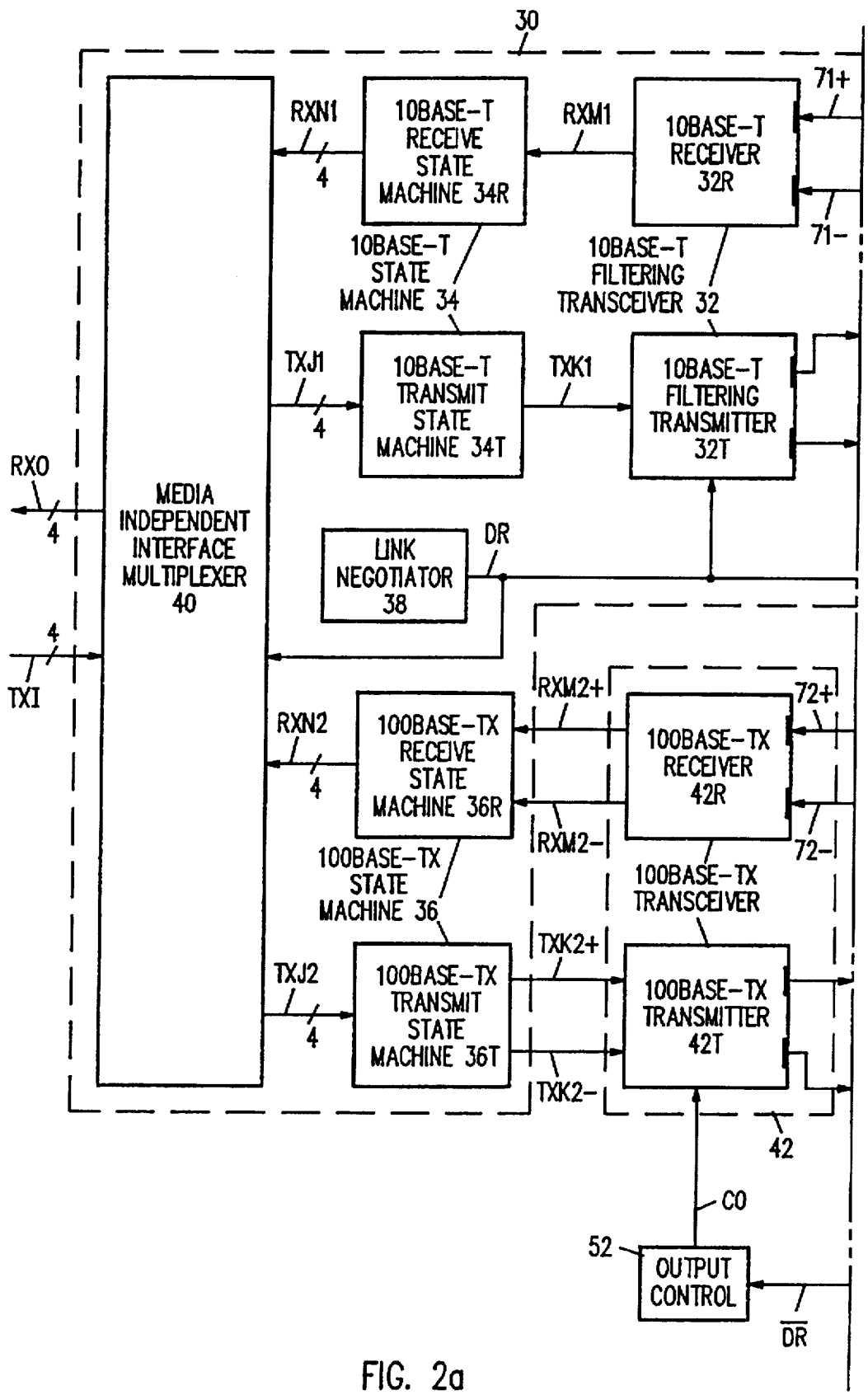
Figure 2B:
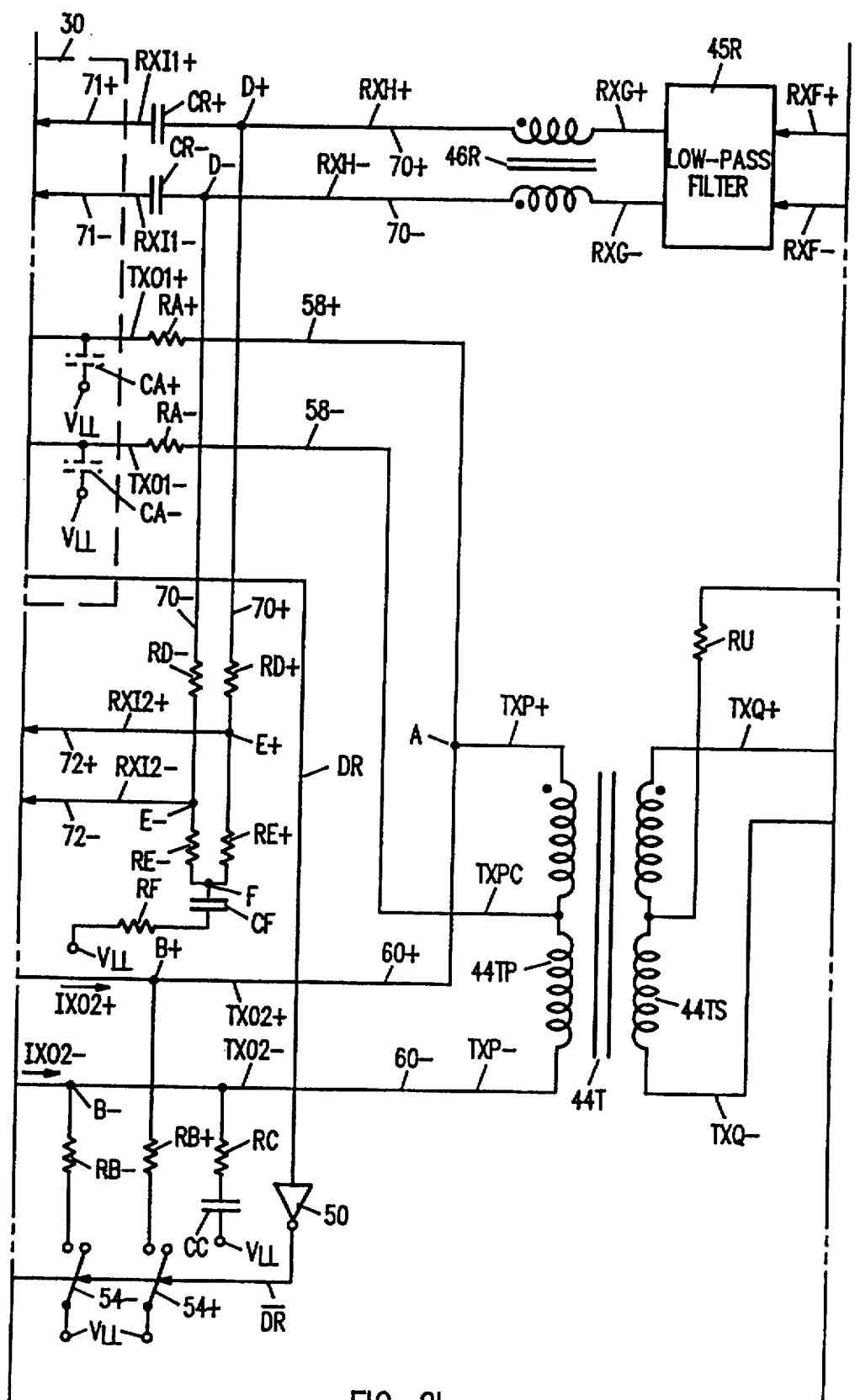

Referring to FIG. 2, it illustrates an interface transceiver apparatus that utilizes a single cable connector and a single pair of isolation magnetics for processing data moving on twisted-pair cables at either of two materially different data transfer rates according to the teachings of the invention. In particular, the interface transceiver apparatus meets the 10Base-T and 100Base-TX protocols of IEEE Standard 802.3 in switching between the 10Base-T cable data rate of 10 Mbps and the 100Base-TX cable data rate of 125 Mbps, effectively 100 Mbps.

The interface apparatus of FIG. 2 is incorporated in information processing equipment such as a personal computer, a work station, a file server, a bridge, a repeater, or DTE in a LAN. The interface apparatus is typically situated on an Ethernet adapter card (or board) along with a suitable media-access controller. However, the apparatus can be a stand-alone unit that connects to a media-access controller located elsewhere.

The interface apparatus transfers—i.e., transmits and receives—data between (a) the information processing equipment in which the apparatus is situated or to which the apparatus is directly connected, hereafter referred to as the "home equipment", and (b) a pair of twisted-pair cables connected at their remote ends to other such information processing equipment, hereafter referred to as the "remote equipment". Data transmission occurs when data is sent from the home equipment through the interface apparatus and one of the twisted-pair cables to the remote equipment. Data reception occurs when data is sent from the remote equipment through the other twisted-pair cable and the interface apparatus to the home equipment.

One of the components of the apparatus of FIG. 2 is a signal-processing/10Base-T transceiver physical-layer integrated circuit ("IC") 30 consisting of a 10Base-T filtering transceiver 32, a 10Base-T state machine 34, a 100Base-TX state machine 36, a link negotiator 38, and a media-independent interface multiplexer 40. Transceiver 32 and state machine 34 together transmit, receive, and process data in accordance with the 10Base-T protocol. Transceiver 32 is divided into a 10Base-T transmitter 32T and a 10Base-T receiver 32R. State machine 34 is formed with a 10Base-T transmit state machine 34T and a 10Base-T receive state machine 34R.

State machine 36 and a separate 100Base-TX transceiver physical-layer IC 42 together transmit, receive, and process data in accordance with the 100Base-TX protocol. State machine 36 is formed with a 100Base-TX transmit state machine 36T and a 100Base-TX receive state machine 36R. Transceiver IC 42 is divided into a 100Base-TX transmitter 42T and a 100Base-TX receiver 42R. The interface apparatus of FIG. 2 further contains a transmit isolation transformer 44T, a receive isolation transformer 44R, a transmit low-pass filter 45T, a receive low-pass filter 45R, a transmit common-mode choke 46T, a receive common-mode choke 46R, an RJ-45 jack connector 48, an inverter 50, an output control 52, switches 54+ and 54−, and various resistors and capacitors (discussed further below), all mounted with ICs 30 and 42 on an Ethernet card (not indicated). The Ethernet card is preferably implemented as a multi-layer printed circuit board.

Outgoing data from the interface apparatus is transmitted to the remote equipment on an outgoing twisted-pair cable 56T consisting of a pair of twisted electrical lines. Similarly, the interface apparatus receives incoming data from the remote equipment on an incoming twisted-pair cable 56R consisting of a pair of twisted electrical lines. Cables 56T and 56R are formed with copper wires. Each of cables 56T and 56R has a characteristic impedance of approximately 100 ohms.

Twisted-pair cables 56T and 56R are usually enclosed in the sheath of a larger cable (not shown) which terminates in a plug 57 insertable into RJ-45 connector 48 so as to connect cables 56T and 56R to the interface apparatus. The larger cable is typically a Category 5 unshielded twisted-pair cable or a Type 1 shielded twisted-pair cable. In the Category 5 unshielded case, the larger cable contains four copper twisted-pair cables, two of which constitute cables 56T and 56R.

The interface apparatus operates between a low supply voltage $V_{LL}$ and a high supply voltage $V_{HH}$ (not shown in FIG. 2) provided from respective voltage/current supplies. $V_{LL}$ and $V_{HH}$ preferably are 0 volt (ground reference) and 5 volts so that the power-supply voltage $V_{HH} - V_{LL}$ is 5 volts.

Link negotiator 38 periodically generates a burst of link pulses which carry information identifying the data processing capability of the home equipment—i.e., whether the home equipment operates in the 10Base-T mode or the 100Base-TX mode or can operate in either mode, and whether the home equipment can simultaneously transmit and receive data (full duplex) or can do only one of transmit and receive at a time (half duplex). Each burst of link pulses is transmitted along outgoing cable 56T to the remote equipment. In particular, the link pulses pass along a line (not indicated) to 10Base-T transmitter 32T where they are converted into differential form and supplied along the 10Base-T data path described below to outgoing cable 56T.

A link negotiator in the remote equipment likewise periodically generates a burst of link pulses which carry information identifying the data processing capability of the remote equipment. These link pulses are differentially transmitted along incoming cable 56R to the apparatus of FIG. 2. The differential link pulses from the remote equipment are then provided along the incoming data path described below to 10Base-T receiver 32R where they are converted into single-ended form and furnished along a line (not indicated) to link negotiator 38.

Link negotiator 38 and the link negotiator in the remote equipment follow a prescribed format in setting up a data communications link between the home and remote equipment. When each link negotiator receives the same burst of link pulses at three consecutive link pulse burst intervals, the negotiator sets an acknowledge bit in its link pulses. The communications link is established after each negotiator receives three additional consecutive link pulse bursts with the acknowledge bit set.

The link negotiators subsequently establish a data link through which communication is performed at the highest common denominator of data transfer capabilities of the home and remote equipment. That is, data is transferred between the home and remote equipment at the 100Base-TX data rate in full duplex if both sets of equipment have 100Base-TX and full duplex capabilities. Otherwise, data transfer occurs at the next highest data transfer capability common to the home and remote equipment. The data link negotiation procedure is termed NWay Autodetect and is further described in "IEEE Link Task Force Autodetect, Specification for NWay Autodetect," Version 1.0, National Semiconductor, 10 Apr. 1994, the contents of which are incorporated by reference herein.

Link negotiator 38 furnishes a data rate signal DR at a high level when data is to be transferred at the 10Base-T rate. Rate signal DR is supplied at a low value when data is to be transferred at the 100Base-TX rate.

During data transmission, the home equipment generates a binary NRZ (non-return-to-zero) data signal TXI which is to be converted into differential form for transmission on outgoing cable 56T. Data signal TXI and rate signal DR are furnished to multiplexer 40. Multiplexer 40 has four lines available for signal TXI. For 10Base-T transmission, signal TXI is either a nibble—i.e., four bits in parallel—coming in at 2.5 Mbps on each of the four lines to produce a cumulative rate of 10 Mbps or a one-bit signal coming in at 10 Mbps on the line that otherwise carries the least significant bit ("LSB") of the four-bit nibble. For 100Base-TX transmission, signal TXI is a four-bit nibble coming in at 25 Mbps on each of the four lines to produce a cumulative rate of 100 Mbps.

If rate signal DR is high indicating selection of the 10Base-T data transfer rate, multiplexer 40 passes data signal TXI to 10Base-T transmit state machine 34T in the form of an NRZ data signal TXJ1. Depending on the condition of signal TXI, data signal TXJ1 is either a nibble or a one-bit signal. If signal DR is low indicating selection of the 100Base-TX data transfer rate, multiplexer 40 provides signal TXI to 100Base-TX transmit state machine 36T in the form of an NRZ nibble data signal TXJ2.

For 10Base-T data transmission, 10Base-T state machine 34T applies a Manchester coding to data signal TXJ1 to create a one-bit Manchester-coded outgoing data stream TXK1 moving at 10 Mbps. This includes serializing signal TXJ1 when it is a four-bit nibble. The Manchester coding reduces EMI.

Data stream TXK1 is supplied to 10Base-T transmitter 32T. Due to the Manchester coding, the TXK1 data stream consists of 100-ns generally square pulses at 5 MHz and 50-ns generally square pulses at 10 MHz. Since 10 MHz is the highest pulse frequency in the TXK1 data stream, the 10Base-T data eventually supplied to outgoing cable 56T has a characteristic data rate frequency of 10 MHz.

Transmitter 32T contains a digital low-pass waveshaping filter (not separately shown in FIG. 2) that filters the TXK1 data stream to attenuate frequency components above a cut-off frequency between 10 MHz and 20 MHz—i.e., between the characteristic data rate frequency and the second harmonic of the characteristic data rate frequency. In so doing, the square TXK1 pulse waveforms are converted into rounded shapes that conform to the voltage template specified by the 10Base-T protocol. The cut-off frequency of the digital filter is typically 15 MHz.

The filtering is done in such a way that the waveforms for the portions of the Manchester-coded TXK1 data stream formed with 50-ms pulses are largely shaped as 10-MHz sine waves. The rising and falling edges of the waveforms for the portions of the TXK1 data stream consisting of 100-ms pulses are provided with substantially the same sine-wave shape as the 50-ms pulses. Preemphasis is applied to the 100-ms TXK1 pulses to reduce inter-symbol jitter. Transmitter 32T also converts the TXK1 data stream into a differential voltage-sourced format having an approximate 5-volt differential peak-to-peak swing.

Figure 3:
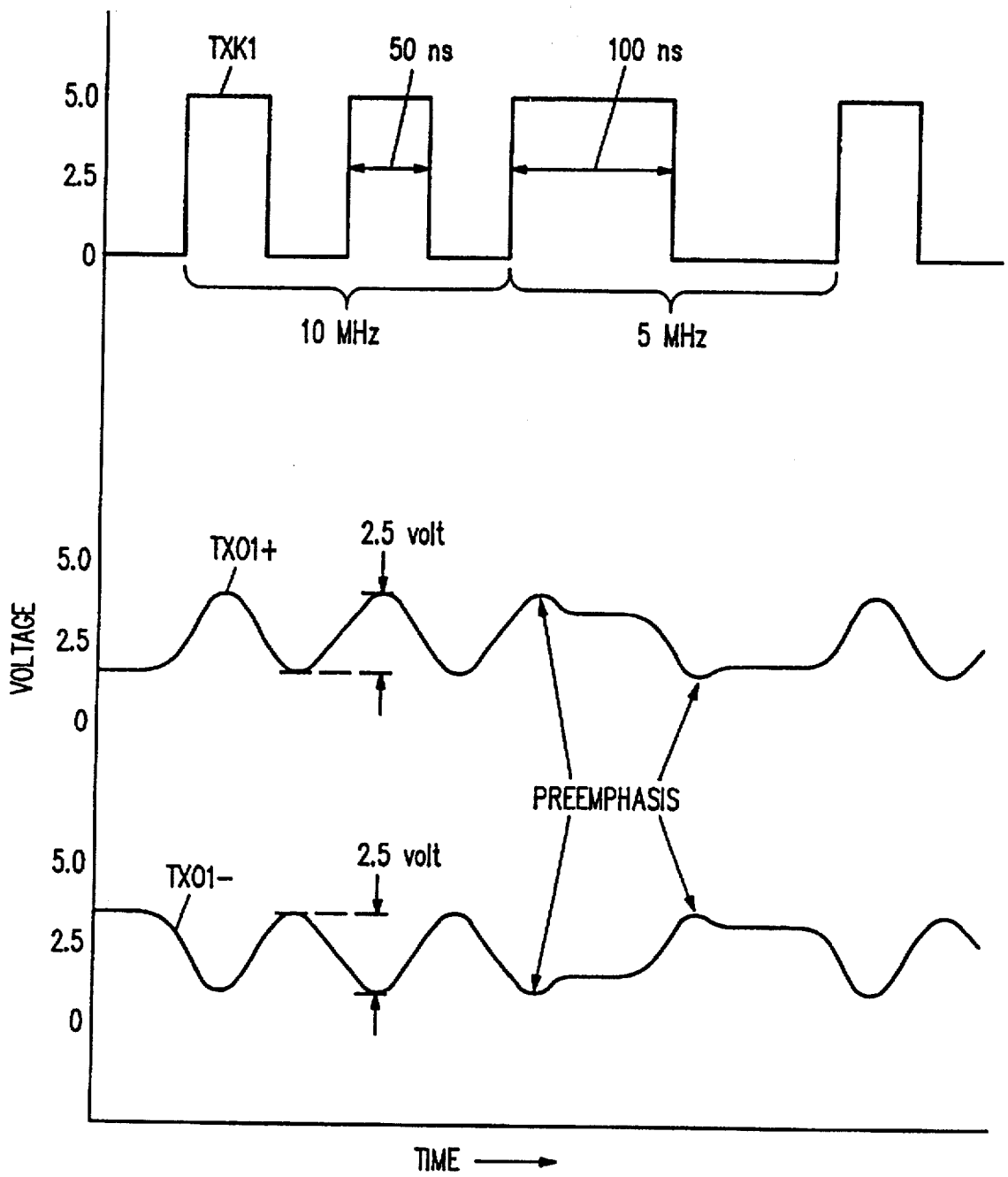
FIG. 3 is a waveform diagram that illustrates the waveshape filtering of the 10Base-T transmitter in the interface apparatus of FIG. 2.

Transmitter 32T has a pair of three-statable data output terminals, referred to as the TXO1+ and TXO1− terminals, from which it respectively provides differential outgoing data signals TXO1+ and TXO1−. When data rate signal DR is high so that 10Base-T operation is selected, data signals TXO1± constitute the filtered versions of the Manchester-coded TXK1 data stream described above. That is, the TXO1± data stream moves at 10 Mbps with preemphasis and a 5-volt peak-to-peak swing across the TXO1± terminals. Each of signals TXO1+ has an individual peak-to-peak swing of approximately 2.5 volts. FIG. 3 depicts waveforms which are simplified in time and shape and which illustrate the filtering performed by transmitter 32T in converting the TXK1 data stream into differential signals-TXO1± for the high DR case.

The TXO1+ and TXO1− terminals of transmitter 32T are coupled respectively through equal-value source terminating resistors RA+ and RA− to outgoing electrical conductors 58+ and 58−. Conductors 58± are short, usually less than 1 cm in length, so that the antenna (radiating) effect on EMI is small. Resistors RA± attenuate data signals TXO1±.

As described further below, conductors 58± are is connected to transmit transformer 44T in a manner that enables transformer 44T to operate in a 1:2 voltage step-up mode with respect to the resulting attenuated differential data signals on conductors 58±. Due to the 1:2 step-up connections, the 100-ohm characteristic impedance of outgoing cable 56T is seen through transformer 44T as a 25-ohm reflected impedance on conductors 58±. Resistors RA± are chosen to have such values that the total driving source impedance—i.e., the combination of resistors RA± and the output impedance of transmitter 32T—matches this 25-ohm reflected impedance. In so doing, resistors RA± cut the 5-volt differential peak-to-peak swing of signals TXO1± approximately in half. The 10-Mbps preemphasized data signals on conductors 58± thus have an approximate 2.5-volt differential peak-to-peak swing during 10Base-T operation.

The TXO1± terminals go into a high-impedance state when rate signal DR is low. This electrically disconnects resistors RA± and, consequently, conductors 58± from transmitter 32T during 100Base-TX operation.

For 100Base-TX data transmission, 100Base-TX state machine 36T performs a 4B/5B symbol conversion on four-bit NRZ nibble data TXJ2 coming in at a cumulative data rate of 100 Mbps. The 4B/5B conversion incorporates control signals into the TXJ2 data to produce five-bit symbols moving at a cumulative data rate of 125 Mbps. The control signals indicate start of transmission, end of transmission, and idle.

State machine 36T scrambles the five-bit symbol data using an appropriate random-number function. Machine 36T serializes the scrambled five-bit symbol data to generate a one-bit binary NRZ data stream moving at 125 Mbps. This corresponds to a maximum pulse frequency of 62.5 MHz. Finally, machine 36T converts the scrambled serial data to a differential format to produce differential data signals TXK2+ and TXK2− moving at 125 Mbps.

100Base-TX transmitter 42T applies an MLT-3 coding to binary NRZ data signals TXK2± to produce a pair of trinary differential data signals moving at 125 Mbps. Since half-height pulses in the scrambled MLT-3 data can have a minimum pulse width corresponding to a frequency of 62.5 MHz, the 100Base-TX data eventually supplied to outgoing cable 56T has a characteristic data rate frequency of 62.5 MHz. Nonetheless, the net effect of the MLT-3 coding is to cut the maximum fundamental frequency of full-height signal transitions to 31.25 MHz—i.e., one half of 62.5 MHz. The combination of scrambling and MLT-3 coding broadens the frequency spectrum and shifts the spectral energy downward (i.e., to lower frequencies) so as to meet the standards prescribed by the FCC for electromagnetic radiation from unintentional radiators at frequencies above 30 MHz.

Transmitter 42T then converts the scrambled differential MLT-3 data into a pair of differential current-sourced data signals IXO2+ and IXO2−. Transmitter 42T has a pair of three-statable data output terminals, referred to as the TXO2+ and TXO2− terminals, from which it respectively furnishes differential outgoing currents IXO2+ and IXO2−. The TXO2+ and TXO2− terminals are respectively coupled through nodes B+ and B− to outgoing electrical conductors 60+ and 60−. As with conductors 58±, conductors 60± are short, normally less than 1 cm so that the antenna effect on EMI again is small. Differential outgoing data signals TXO2+ and TXO2− are present on conductors 60+ and 60−. The relationship between currents IXO2± and data signals TXO2± is discussed further below.

Inverter 50 inverts rate signal DR to produce an inverted data rate signal $\overline{DR}$. Output control 52 which operates in response to signal $\overline{DR}$ furnishes a control signal CO to transmitter 42T. A pair of equal-value resistors RB+ and RB− respectively terminate conductors 60+ and 60−. Resistors RB± provide a matching resistance to the 100-ohm characteristic impedance of outgoing cable 56T during 100Base-TX operation. Resistor RB+ is connected in series with switch 54+ between node B+ and the $V_{LL}$ supply. Resistor RB− is similarly connected in series with switch 54− between node B− and the $V_{LL}$ supply. Switches 54± both respond to signal $\overline{DR}$.

During 100Base-TX operation, the low value of signal DR causes signal $\overline{DR}$ to be high. Switches 54± thereby close so as to couple the TXO2± terminals to the $V_{LL}$ supply by way of terminating resistors RB±. Control signal Co causes currents IXO2± to be supplied at prescribed high current levels. The resulting voltages developed across resistors RB± by currents IXO2± cause outgoing data signals TXO2± to be generated with an approximate 2-volt peak-to-peak swing across conductors 60±. Signals TXO2± move at 125 Mbps with scrambled MLT-3 coding.

The IXO2± current-sourced signals are reduced substantially to zero during 10Base-T operation when rate signal DR is high. This electrically disconnects transmitter 42T from conductors 60±. In addition, switches 54± open to remove the electrical termination provided by resistors RB±, thereby allowing resistors RA± to provide the necessary impedance to match the characteristic impedance of incoming cable 56R.

Transmit transformer 44T isolates outgoing cable 56T from the circuitry that produces signals TXO1± and TXO2±. Transformer 44T has a primary winding 44TP and a secondary winding 44TS. Conductors 58+ and 60+ are connected through a node A to the positive (dotted) end of primary winding 44TP. Conductors 58− and 60− are respectively connected to the center tap and negative (undotted) end of winding 44TP. The data signals at the positive end, center tap, and negative end of winding 44TP are respectively indicated as signals TXP+, TXPC, and TXP− in FIG. 2.

The positive and negative ends of secondary winding 44TS respectively furnish differential outgoing data signals TXQ+ and TXQ−. The center tap of winding 44TS is coupled through a resistor RU, a node C, and a common capacitor CV to the $V_{LL}$ supply. Resistor RU provides common-mode termination. Capacitor CV furnishes voltage isolation between the home and remote equipment so as to protect users from high voltage. For this purpose, capacitor CV typically has a breakdown voltage of 1.5 Kv. Capacitor CV can be implemented as a discrete element. Alternatively, capacitor CV can be implemented as a built-in part of the multi-layer Ethernet card that carries the circuit components.

During 10Base-T data transmission, conductors 60± are effectively open circuited. Signals TXO1± thereby pass through resistors RA± and onto conductors 58± to become signals TXP+ and TXPC which are respectively transformed into outgoing signals TXQ± moving at 10 Mbps. Since conductor 58− is connected to the center tap of primary winding 44TP, transformer 44T functions as a 1:2 step-up device that converts the approximate 2.5 volt differential peak-to-peak swing of signals TXP+ and TXPC into an approximate 5-volt differential peak-to-peak swing for signals TXQ±.

During 100Base-TX data transmission, conductors 58± are effectively open circuited. Signals TXO2± pass along conductors 60± to become outgoing signals TXP± which are respectively transformed into outgoing signals TXQ± moving at 125 Mbps with the approximate 2.0-volt differential peak-to-peak swing of signals TXO2±. In shunting primary winding 44TP, resistors RB± are chosen to have values that enable the characteristic impedance of conductors 60± to match the 100-ohm characteristic impedance of cable 56T.

Parasitic capacitances CA+ and CA−, which are approximately equal in value, are respectively associated with the TXO1+ and TXO1− output terminals of transmitter 32T. During 100Base-TX operation, capacitances CA± need to be taken into account. Because the TXO1± terminals are effectively disconnected from conductors 58± during 100Base-TX operation, resistor RA+ and capacitance CA+ are operatively connected in series between the $V_{LL}$ supply and conductor 58+ at the positive end of primary winding 44TP. Accordingly, a resistor RC and a (real) capacitor CC are inserted between the $V_{LL}$ supply and conductor 60− at the negative end of winding 44TP. By choosing resistor RC and capacitor CC to have the same respective values as resistor RA+ and capacitance CA+, the apparatus is balanced during 100Base-TX data transmission. This reduces undesired common-mode-to-differential conversion gain.

Transmit low-pass filter 45T filters signals TXQ+ and TXQ− to respectively produce differential outgoing data signals TXS+ and TXS−. In particular, filter 45T attenuate frequency components above a cut-off frequency in the vicinity of 125 MHz. This is above the 62.5-MHz characteristic data rate frequency of the 100Base-TX data supplied to outgoing cable 56T. In the conversion of signals TXO2± (or IXO2±) into signals TXS± during 100Base-TX transmission, low-pass filter 45T attenuates frequency components above approximately 125 MHz.

Low-pass filter 45T is in the data path for signals TXO1±. However, signals TXO1± are supplied from 10Base-T transmitter 32T with frequency components above 20 MHz, typically above 15 MHz, already attenuated due to the low-pass filtering of the digital waveshaper contained in transmitter 32T. Since the cut-off frequency of filter 45T is considerably higher than that of the digital waveshaper, the low-pass filtering action of filter 45T does not significantly affect the conversion of signals TXO1± into signals TXS±.

The present apparatus is designed so that the 100Base-TX data path does not pass through the digital waveshaping filter in transmitter 32T. Accordingly, the fact that transmitter 32T has a considerably smaller bandwidth than filter 45T is immaterial to 100Base-TX transmission. Importantly, this is accomplished with a single transmit isolation transformer and without using hot signal switching in the data-transmission paths.

Transmit common-mode choke 46T converts signals TXS+ and TXS− respectively into outgoing differential data signals TX+ and TX−. Choke 46T attenuates the common-mode-to-differential conversion gain. Signals TX± pass through RJ-45 connector 48 and plug 57 where they are supplied to the two twisted lines of cable 56T for transmission to the remote equipment.

Figure 4:
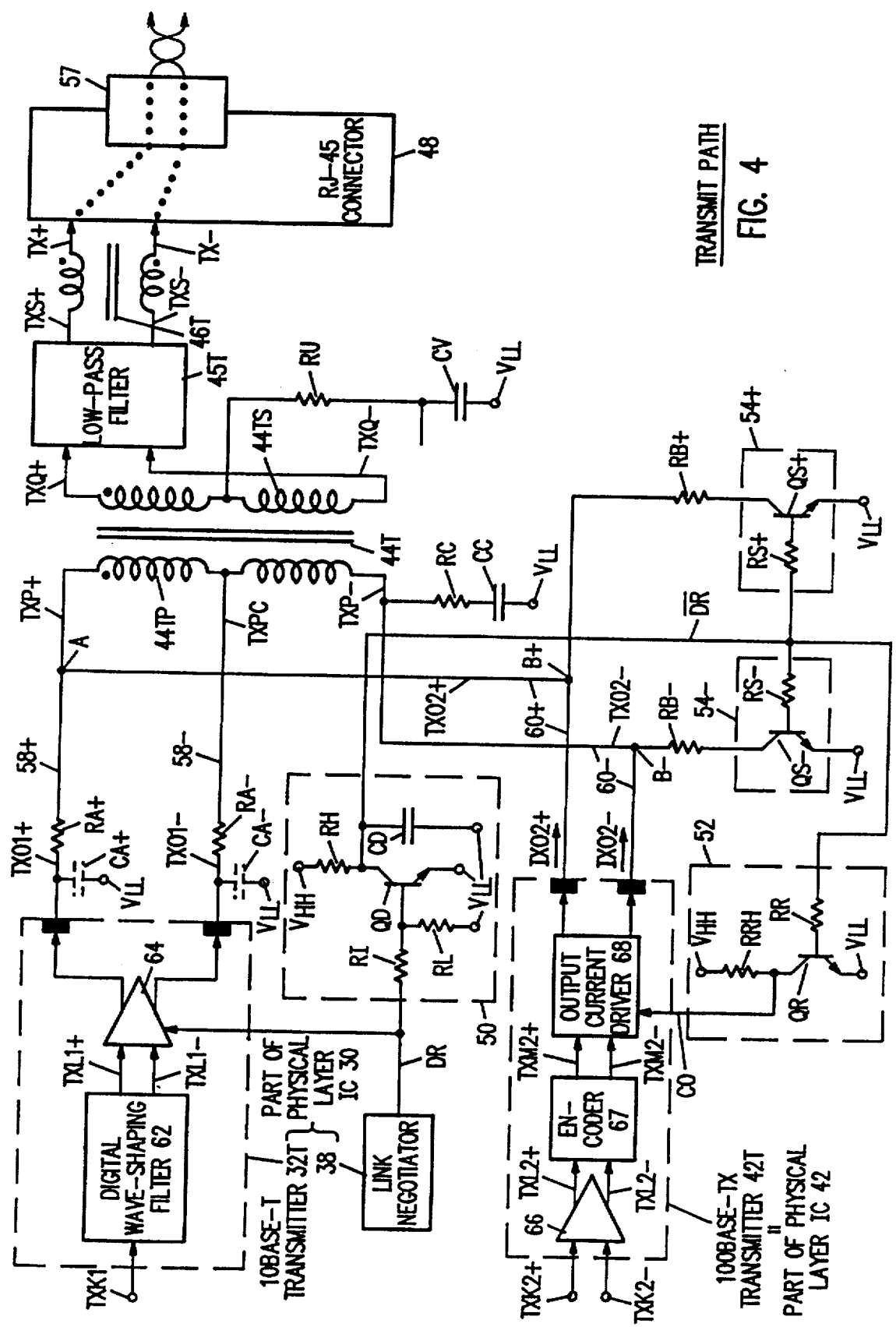
FIG. 4 is a block/circuit diagram of an embodiment of part of the data transmission path for the interface apparatus in FIG. 2.

FIG. 4 depicts a preferred embodiment of part of the data-transmission path. In particular, FIG. 4 illustrates details for the transmission path section extending from transmitters 32T and 42T to outgoing cable 56T.

Beginning with inverter 50, it preferably consists of an NPN transistor QD, an input resistor RI, an output resistor RH, a further resistor RL, and a capacitor CD. Output control 52 is formed with an NPN transistor QR, an input resistor RR, and a reference resistor RRH. Switch 54+ consists of an NPN transistor QS+ and an input resistor RS+. Switch 54– is similarly formed with an NPN transistor QS– and an input resistor RS–. Transistors QD, QR, and QS± are preferably implemented with a transistor array such as the MPQ2222 quad transistor array IC made by National Semiconductor.

10Base-T transmitter 32T consists of a digital waveshaping filter 62 and a three-statable output buffer 64. Waveshaping filter 62 filters the TXK1 data stream in the manner described above to generate filtered differential data signals TXL1+ and TXL1– having preemphasis and an approximate 5-volt differential peak-to-peak swing. The TXL1± waveforms meet the preemphasized waveshape specifications of the 10Base-T protocol. Filter 62 is preferably implemented in the manner described in Segaram, U.S. patent application Ser. No. 08/133,405, filed 7 Oct. 1993 now U.S. Pat. No. 5,410,188, the contents of which are incorporated by reference herein.

Output buffer 64 is controlled by data rate signal DR. When signal DR is high, buffer 64 amplifies signals TXL1± to produce data signals TXO1± at the TXO1± terminals. For this purpose, buffer 64 is preferably biased at approximately 2.5 volts relative to $V_{LL}$. When signal DR is low, buffer 64 places the TXO1± terminals in a high-impedance condition.

100Base-TX transmitter 42T contains an input buffer 66, an encoder 67, and a programmable output current driver 68. Input buffer 66 amplifies signals TXK2± to produce binary differential data signals TXL2+ and TXL2–. Encoder 67 generates trinary differential data signals TXM2+ and TXM2– by applying MLT-3 codings to data signals TXL2±. Output current driver 68 converts differential signals TXM2± into current-sourced signals IXO2± and supplies currents IXO2± to the TXO2± terminals.

Next consider data reception. Turning back to FIG. 2, receive isolation transformer 44R has a primary winding 44RP and a secondary winding 44RS. Differential data signals RX+ and RX– are supplied from the two twisted lines of incoming cable 56R to the ends of primary winding 44RP at either the 10Base-T data rate of 10 Mbps or the 100Base-X cable data rate of 125 Mbps. The center tap of winding 44RP is coupled through a resistor RW, node C, and capacitor CV to the $V_{LL}$ supply. As with resistor RU, resistor RW provides common-mode termination.

Transformer 44R converts differential incoming data signals RX+ and RX– respectively into differential data signals RXF+ and RXF– supplied from the ends of secondary winding 44RS at substantially the same voltage swing as that of signals RX±. In so doing, transformer 44R isolates incoming cable 56R from the data-receiving circuitry that processes signals RXF±. Receive low-pass filter 45R produces differential data signals RXG+ and RXG– by respectively filtering data signals RXF+ and RXF– to attenuate frequency components above a cut-off frequency in the vicinity of 125 MHz.

The ends of secondary winding 44RS are electronically coupled through filter 45R and receive common-mode choke 46R respectively to electrical conductors 70+ and 70–. Choke 46R converts signals RXG+ and RXG– respectively into differential incoming data signals RXH+ and RXH– supplied on conductors 70+ and 70–. In so doing, choke 46R attenuates the common-mode-to-differential conversion gain. Conductors 70± have a characteristic impedance of 100 ohms—i.e., the same as that of cable 56R.

10Base-T receiver 32R and 100Base-TX receiver 42R have different DC input bias levels. To avoid DC input discrepancy between receivers 32R and 42R, incoming signals RXH± are AC coupled to receiver 32R. In particular, conductors 70+ and 70– are tapped at nodes D+ and D– from where they are coupled through equalvalue DC blocking capacitors CR+ and CR– to a pair of data input terminals, referred to as the RXI1+ and RXI1– terminals, of receiver 32R. Capacitors CR+ and CR– respectively block any DC components present in signals RXH+ and RXH– to produce differential incoming data signals RXI1+ and RXI1– at the RXI1+ and RXI1– terminals. Signals RXI1± thus have substantially the same AC voltage swing as signals RXH±. To keep the antenna effect low, electrical lines 71+ and 71– that connect capacitors CR± to the RXI1± terminals are less than 1 cm in length.

Signals RX±, and thus signals RXI1±, are Manchester coded during 10Base-T data reception. Receiver 32R converts signals RXI1± into a single Manchester-coded data stream RXM1 moving at 10 Mbps. 10Base-T receive state machine 34R decodes the RXM1 data stream and converts it into an NRZ data signal RXN1. Depending on the format desired, state machine 34R generates signal RXN1 as a nibble on four lines or as a one-bit signal on the line that otherwise carries the LSB of the four-bit nibble.

Conductors 70± are further coupled in a daisy chain—i.e. non interruptible—manner to receiver 42R. In particular, conductors 70+ and 70– are coupled respectively through a pair of voltage dividers to a pair of data input terminals, referred to as the RXI2+ and RXI2– terminals, of receiver 42R. During 100Base-X reception, the voltage swings of signals RXH± are slightly high for receiver 42R. The voltage dividers attenuate signals RXH+ and RXH– to respectively provide the RXI2+ and RXI2– terminals with differential data signals RXI2+ and RXI2– at voltage swings that provide good adaptive equalization.

The voltage dividers are respectively formed with equal-value terminating resistors RD+ and RD– and equal-value terminating resistors RE+ and RE– connected to resistors RD+ and RD– by way of divider nodes E+ and E– from which signals RXI2+ and RXI2– are furnished to receiver 42R. Resistors RD± are connected to conductors 70±. Electrical lines 72+ and 72– that connect nodes E± to the RXI2± terminals are less than 1 cm in length so as to keep the antenna effect low. Resistors RE± are connected together at a node F. In combination, resistors RD± and RE± form a network that terminates lines 70± with an approximate 100-ohm impedance to match the characteristic 100-ohm impedance of cable 56R.

A DC blocking capacitor CF and a further resistor RF are connected between node F and the $V_{LL}$ supply. Capacitor CF prevents the input DC bias level at the TXO2± terminals from being affected by the $V_{LL}$ supply. Resistor RF reduces the common-mode current and thereby reduces the common-mode-to-differential conversion gain.

Signals RX±, and thus signals RXI2±, are encoded with a scrambled MLT-3 coding during 100Base-TX data reception. 100Base-TX receiver 42R determines whether signals RXI2± meet certain minimum input squelch voltage thresholds and, when met, appropriately amplifies signals RXI2±. In addition, receiver 42R decodes the amplified MLT-3 data to produce a pair of binary NRZ differential data signals RXM2± and RXM2± moving at 125 Mbps.

100Base-TX receive state machine 36R converts scrambled NRZ differential data signals RXM2± to a single-ended form. State machine 36R then deserializes the single-ended data stream to generate five-bit symbols moving at a cumulative date rate of 125 Mbps. Machine 36R descrambles the five-bit NRZ symbol data to recover the original information processed by the remote equipment.

Finally, state machine 36R performs a 5B/4B symbol conversion on the descrambled five-bit symbol data to generate a four-bit nibble data signal RXN2. The 5B/4B conversion removes control signals imbedded into the RX± data stream for twisted-pair cable transmission. During the 5B/4B conversion, the cumulative data rate is reduced to 100 Mbps. Each bit of nibble RXN2 moves at 25 Mbps.

Multiplexer 40 generates an NRZ data signal RXO for supply to the home equipment. Multiplexer 40 has four lines available for signal RXO. If rate detection signal DR is high indicating selection of the 10Base-T data rate, signal RXN1 passes through multiplexer 40 to become signal RXO on all four lines as a nibble at 2.5 Mbps per line or on one line as a one-bit signal at 10 Mbps. If signal DR is low indicating selection of the 100Base-TX data rate, signal RXN2 passes through multiplexer 40 to become signal RXO as a nibble on the four lines at 25 Mbps per line.

By furnishing receivers 32R and 42R with received data by way of the daisy chain consisting of conductors 70±, capacitors CR±, and the voltage dividers, the characteristic impedance of conductors 70± is largely constant during normal apparatus operation. No hot switching elements need to be placed in the data reception path. This avoids discontinuities in the characteristic impedance of conductors 70± and thereby avoids EMI and reflections that would result from such discontinuities.

The voltage dividers implemented with termination resistors RD± and RE± enable incoming signals RXI2± to be provided at desired voltage levels during 100Base-TX operation without detrimentally affecting incoming signals RXI1± during 10Base-T operation. As with the data transmission path, only a single isolation transformer needs to be employed in the data reception path.

Figure 5:
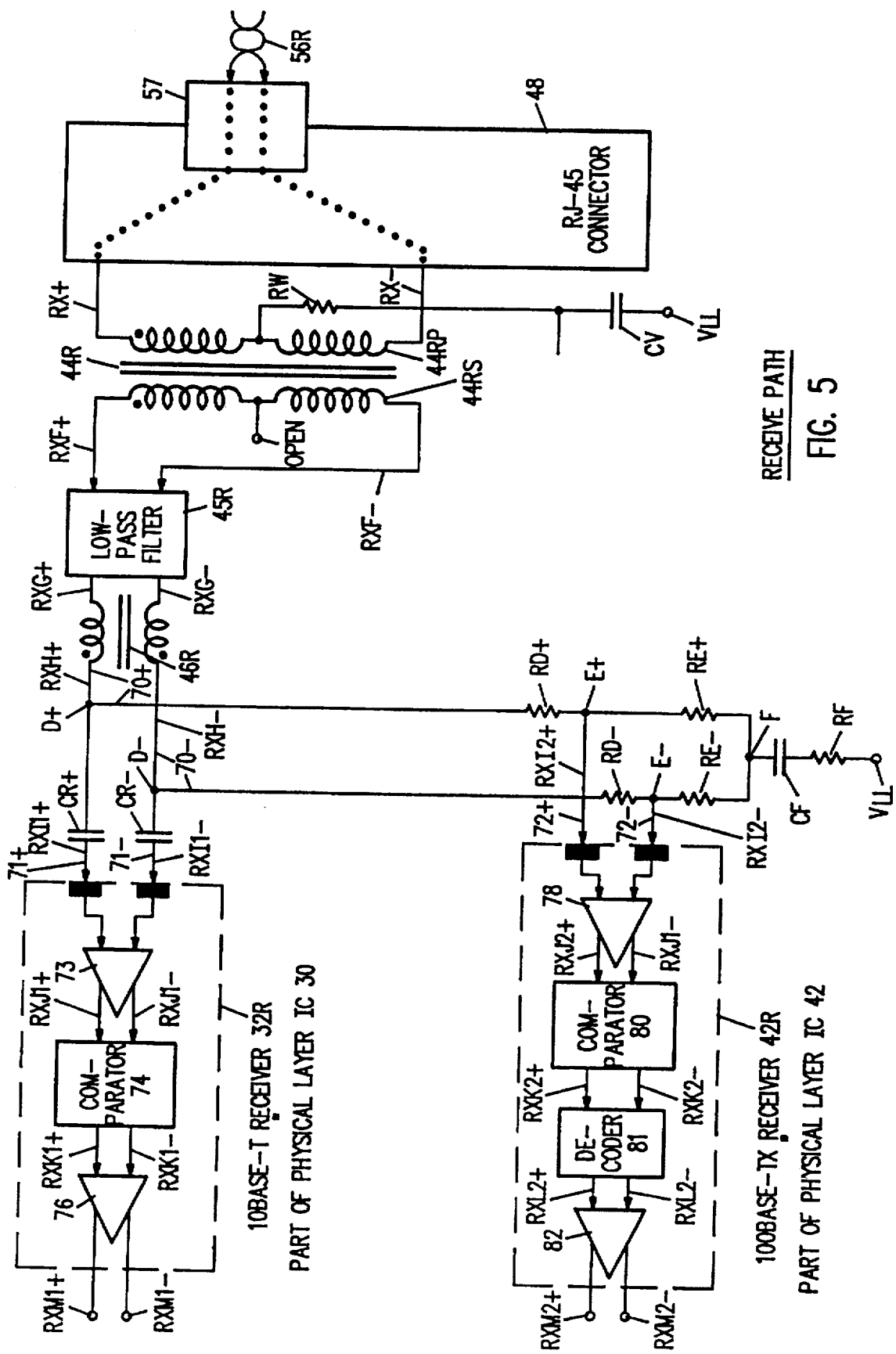
FIG. 5 is a block/circuit diagram of an embodiment of part of the data reception path for the interface apparatus in FIG. 2.

FIG. 5 depicts a preferred embodiment of part of the data reception path. In particular, FIG. 5 illustrates details for the reception path section extending from incoming cable 56R to receivers 32R and 42R.

As indicated in FIG. 5, 10Base-T receiver 32R is preferably formed with an input buffer 73, a comparator 74, and an output buffer 76. Input buffer 73 presents a high input impedance and amplifies incoming signals RXI1± to produce differential data signals RXJ1± and RXJ1−. Comparator 74 determines whether data signals RXJ1± meet required minimum voltage requirements and provides corresponding differential data signals RXK1+ and RXK1−. Output buffer 76 amplifies signals RXK1+ to produce data signals RXM1± for further signal processing according to the 10Base-T protocol.

100Base-TX receiver 42R is formed with an input buffer 78, a comparator 80, a decoder 81, and an output buffer 82. Input buffer 78 presents a high impedance and amplifies incoming signals RXI2±, which are MLT-3 coded, to produce differential data signals RXJ2+ and RXJ2−. Comparator 80 generates differential data signals RXK2+ and RXK2− by quantizing signals RXJ2±. Decoder 81 decodes MLT-3 signals RXK2± to produce binary NRZ differential data signals RXL2+ and RXL2−. Buffer 82 amplifies signals RXL2± to generate signals RXM2± for further signal processing according to the 100Base-TX protocol.

The resistors and capacitors used in the interface transceiver apparatus of FIGS. 2, 4, and 5 preferably have the values given in the following table:

| Resistor(s) | Value | Capacitor(s) | Value |
|---|---|---|---|
| RA±, RC | 12.5 Ω | CC, CA± | 18 pF |
| RB± | 50 Ω | CR± | 0.1 μF |
| RD± | 10 Ω | CF | 0.01 μF |
| RE± | 40 Ω | CD | 27 pF |
| RF | 75 Ω | CV | 100 pF |
| RU, RW | 75 Ω | | |
| RRH | 500 Ω | | |
| RI | 2.7 KΩ | | |
| RH | 390 Ω | | |
| RL | 1 KΩ | | |
| RR, RS± | 390 Ω | | |

The input bias levels of receivers 32R and 42R respectively are 3.75 and 2.75 volts. Conductors 70± are microstrip lines.

Transceiver IC 42 preferably consists of the DP83223 Twister IC made by National Semiconductor. See "DP83223 TWISTER Twisted Pair FDDI Transceiver Device," preliminary data sheet, National Semiconductor, July, 1993, pages 1–10, the contents of which are incorporated by reference herein. Transmit transformer 44T, transmit filter 45T, and choke 46T can be implemented with a single unit such as the BEL 0556-3899-04 interface module or the BEL 5556-3899-05 interface module. The same applies to receive transformer 44R, receive filter 45R, and choke 46R.

The interface apparatus of FIGS. 2, 4, and 5 preferably includes a capability for handling data transmissible over fiber optical cables in accordance with the ANSI X3T9.5 standard commonly referred to as FDDI (fiber distributed data interface). The FDDI standard prescribes a data transfer rate of 100 Mbps. However, certain control signals are incorporated into the FDDI data stream before it is furnished to an optical cable. As a result, the FDDI cable data transfer rate is 125 Mbps. In fact, the FDDI data-stream specifications are part of the proposed 100Base-TX protocol.

FDDI data utilizes the 100Base-TX transmit and receive data paths in the apparatus of FIGS. 2, 4 and 5. However, the FDDI processing is slightly different from the normal 100Base-TX twisted-pair processing. Instead of data scrambling and MLT-3 coding, NRZI (non-return-to-zero/invert-on-one) coding is used on the FDDI data to reduce EMI and meet the FCC electromagnetic emission standards for frequencies above 30 MHz.

In particular, 100Base-TX transmit state machine 42T typically applies an NRZI coding to the outgoing NRZ 100-Mbps FDDI data stream after performing the 4B/5B symbol conversion that increases the cumulative data rate to 125 Mbps. Alternatively, 100Base-TX transmitter 42T can perform the NRZI coding. In either case, transmitter 42T does not perform the MLT-3 coding. Similarly, 100Base-TX receive state machine 42R typically decodes the incoming NRZI-coded 125-Mbps FDDI data to produce 125-Mbps NRZ data before doing the 5B/4B symbol conversion that reduces the cumulative data rate to 100 Mbps. Receiver 42R can alternatively decode the NRZI data to produce the NRZ data.

Figure 6:
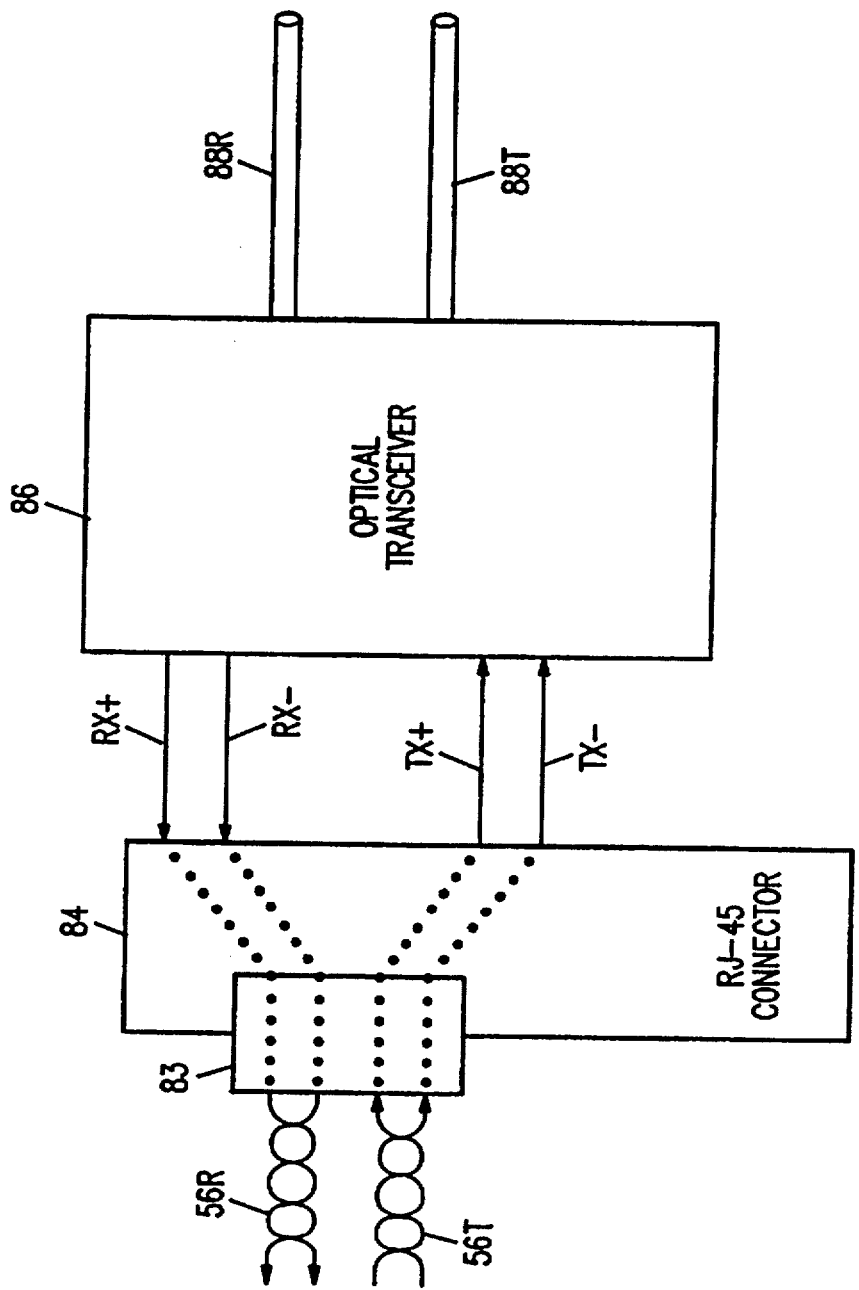
FIG. 6 is a block diagram of an optical transceiver apparatus employable with the interface transceiver apparatus of FIG. 2.

FIG. 6 illustrates an example of how the interface apparatus of FIGS. 2, 4, and 5 is augmented to utilize the FDDI capability. The remote ends of twisted-pair copper cables 56T and 56R in the apparatus of FIGS. 2, 4, and 5 terminate in a plug 83 insertable into an RJ-45 connector 84 situated at the edge of a translator board (not shown). RJ-45 connector is connected to an optical transceiver 86 located on the translator board. Optical transceiver 86 is further connected to an outgoing optical cable 88T and an incoming optical cable 88R.

Optical transceiver 86 contains an optical transmitter portion (not separately shown) and an optical receiver portion (also not separately shown). During data transmission, the optical transmitter portion converts differential signals TX± from cable 56T into an optical signal which is transmitted through outgoing optical cable 88T to the remote equipment. The opposite occurs during data reception. The optical receiver portion converts an optical signal received from the remote equipment on incoming optical cable 88R into differential signals RX± which are supplied to cable 56R.

In the preceding way, the composite interface apparatus of FIGS. 2, 4, 5, and 6 transmits and receives FDDI data moving along optical cables 88T and 88R at the 100Base-TX cable rate of 125 Mbps. The composite interface apparatus can also handle data moving at 10 Mbps in accordance with the 10Base-T protocol.

Figure 7:
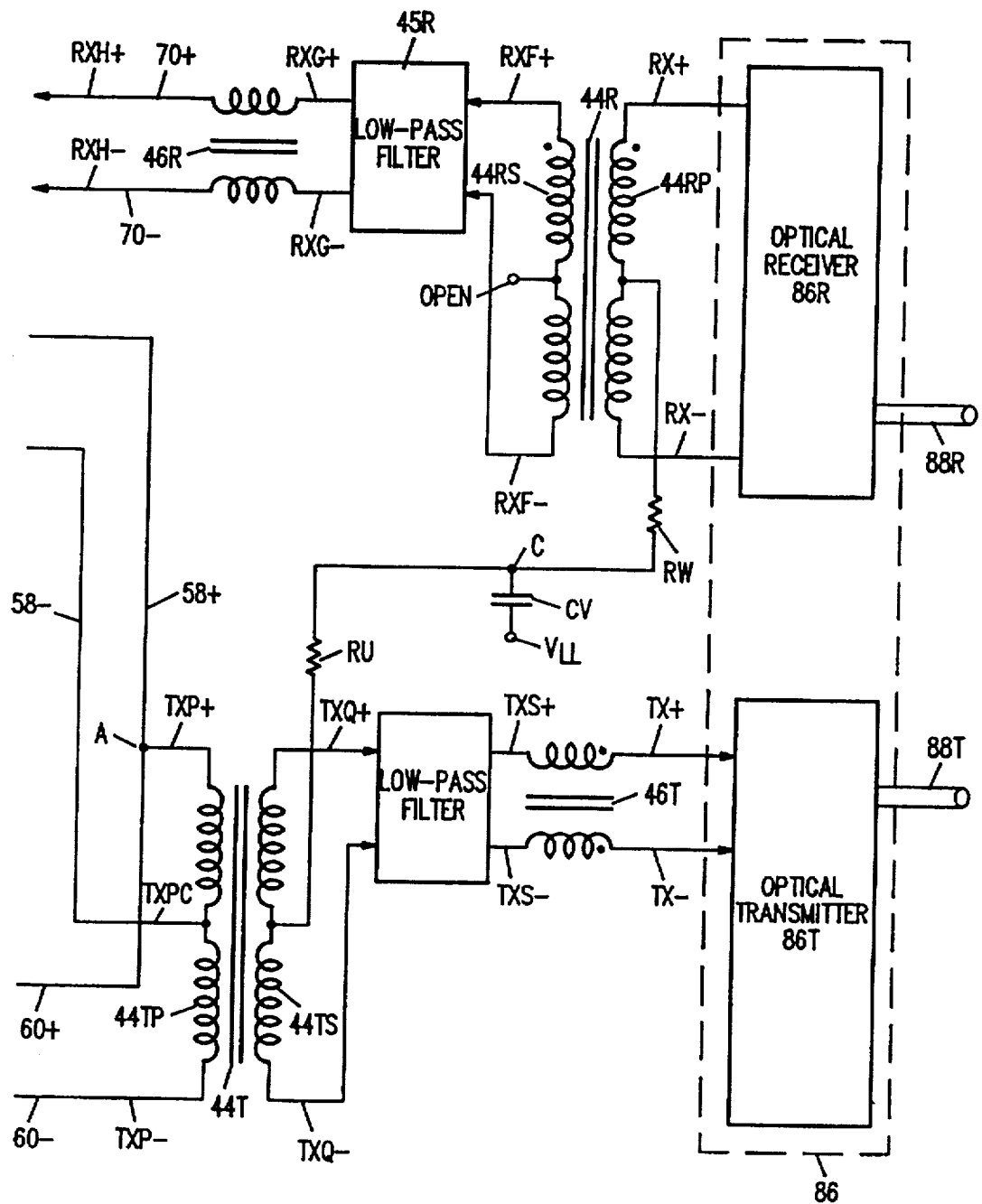
FIG. 7 is a block diagram of part of an interface transceiver apparatus that meets the 10Base-T and 100Base-TX communication protocols for optical cables in accordance with the invention.

FIG. 7 illustrates an alternative embodiment of how optical transceiver 86 is employed in an interface transceiver apparatus according to the invention. In the embodiment of FIG. 7, twisted-pair cables 56T and 56R are eliminated along with RJ-45 connectors 48 and 84. Optical transceiver 86 is then directly connected to transformer assemblies 44T/45T/46T and 44R/45R/46R.

In particular, optical transceiver 86 in FIG. 7 consists of an optical transmitter 86T and an optical receiver 86R. Optical transmitter 86T converts electrical data signals TX± from transmit choke 46T into optical data transmitted on optical cable 88T. Optical receiver 86R converts optical data on optical cable 88R into electrical data signals RX± supplied to receive transformer 44R. Optical transceiver 86 is placed on the same Ethernet card as the other components. A suitable connector is employed to permit optical cables 88T and 88R to be readily connected to, and disconnected from, transceiver 86.

While the invention has been described with reference to particular embodiments, this description is solely for the purpose of illustration and is not to be construed as limiting the scope of the invention claimed below. For example, at least one of the two data transfer rates could differ from the 10Base-T and 100Base-TX data transfer rates. The present interface apparatus could be part of a larger interface apparatus that handles data moving at any of three or more different data transfer rates and protocols.

10Base-T transmitter 32T could be replaced with a 10Base-T transmitter that generates outgoing data at twice the output voltage level given above. In this case, conductor 58− would be coupled to the negative end of primary winding 44TP rather than to the center tap.

If the incoming signals representing the received data at the lower (rather than higher) data rate need attenuation, the data reception path could go from receive transformer 44R to 100Base-TX receiver 42 and then in a non-interruptible daisy chain manner to 10Base-T receiver 32. Blocking capacitors CR± could be moved down to the inputs of 100Base-TX receiver 42R. With suitable rearrangement of the DC input bias networks in receivers 32R and 42R, capacitors CR could even be deleted.

Certain of components 50, 52, and 54± could be incorporated into physical-layer ICs 30 and 42. For instance, output control 52 could be moved into 100Base-TX transceiver 42T to become part of IC 42. Capacitor CV could be split into two capacitors.

Link negotiator 38 could be replaced with circuitry that simply detects whether data is being transferred at 10 or 100 Mbps and generates a data rate signal at a corresponding value. Instead of filtering the 100Base-TX data with low-pass filter 45T situated in the secondary winding of transmit transformer 44T, frequency components above the 62.5-MHz characteristic data rate frequency of the 100Base-TX cable data could be attenuated with a suitable low-pass filter situated elsewhere in the 100Base-TX data path.. Various modifications and applications may thus be made by those skilled in the art without departing from the true scope and spirit of the invention as defined in the appended claims.

I claim:

1. Electronic apparatus comprising:
    an isolation transformer having a primary winding and a secondary winding;
    a connecting unit electronically coupled to the secondary winding and connectable to a pair of lines of a twisted-pair cable so as to electronically couple the twisted-pair cable to the secondary winding;
    a first transmitter that low-pass filters digital data to produce outgoing data which the first transmitter differentially transmits to the primary winding largely at a first data transfer rate; and
    a second transmitter that differentially transmits outgoing data to the primary winding largely at a second data transfer rate different from the first data rate.

2. Apparatus as in claim 1 wherein the second data rate is greater than the first data rate.

3. Apparatus as in claim 2 further including a transmit filter that low-pass filters outgoing data from the second transmitter at a frequency bandwidth greater than that of the first transmitter.

4. Apparatus as in claim 3 wherein the transformer is electronically coupled through the transmit filter to the connecting unit.

5. Apparatus as in claim 2 wherein:
    outgoing data at the first data rate has a first characteristic data rate frequency; and
    outgoing data at the second data rate has a second characteristic data rate frequency greater than the first characteristic data rate frequency.

6. Apparatus as in claim 5 wherein:
    the first transmitter has a low-pass cut-off frequency in the range extending between the characteristic data rate frequencies; and
    the apparatus includes a filter that low-pass filters outgoing data from the second transmitter, the transmit filter having a low-pass cut-off frequency greater than or equal to the second characteristic data rate frequency.

7. Apparatus as in claim 2 further including a pair of first impedance elements, outgoing data from the first transmitter being transmitted differentially through the first impedance elements respectively to a pair of first electrical conductors coupled to the primary winding.

8. Apparatus as in claim 7 further including a pair of second impedance elements, outgoing data from the second transmitter being transmitted differentially on a pair of second electrical conductors coupled to the primary winding, each second impedance element coupled between a source of a common reference voltage and a corresponding one of the second electrical conductors.

9. Apparatus as in claim 8 wherein each impedance element comprises a resistor.

10. Apparatus as in claim 8 further including rate circuitry that determines whether outgoing data is to be transmitted at the first data rate or at the second data rate and generates a corresponding data rate signal.

11. Apparatus as in claim 10 further including a pair of switches respectively corresponding to the second impedance elements, each switch coupled in series with the corresponding second impedance element between the source of the common reference voltage and the corresponding second electrical conductor, the switches opening when the data rate signal indicates that outgoing data is to be transmitted at the first data rate and closing when the data rate signal indicates that outgoing data is to be transmitted at the second data rate.

12. Apparatus as in claim 2 further including a common-mode choke through which the secondary winding is electronically coupled to the connecting unit.

13. Apparatus as in claim 2 further including:
   a first transmit state machine that performs state functions on digital data to produce data supplied at the first data rate to the first transmitter;
   a second transmit state machine that performs state functions on digital data to produce data, supplied at the second data rate to the second transmitter; and
   selection circuitry that selectively passes digital data either to the first state machine or to the second state machine.

14. Apparatus as in claim 2 further including: a further isolation transformer having a further primary winding and a further secondary winding, the connecting unit being electronically coupled to the further primary winding and connectable to a pair of lines of a further twisted-pair cable so as to electronically couple the further twisted-pair cable to the further primary winding;
   a first receiver that differentially receives incoming data from the further secondary winding largely at the first data rate; and
   a second receiver that differentially receives incoming data from the further secondary winding largely at the second data rate.

15. Apparatus as in claim 2 wherein the transmitters transmit outgoing data along data transfer paths that extend in an electrically non-interruptible manner from the transmitters to the primary winding.

16. Electronic apparatus comprising:
   an isolation transformer having a primary winding and a secondary winding;
   a connecting unit electronically coupled to the primary winding and connectable to a pair of lines of a twisted-pair cable so as to electronically couple the twisted-pair cable to the primary winding;
   a first receiver that differentially receives incoming data from the secondary winding largely at a first data transfer rate; and
   a second receiver that differentially receives incoming data from the secondary winding largely at a second data transfer rate different from the first data rate, incoming data from the secondary winding being provided along data transfer paths that extend from the secondary winding through where one of the receivers physically receives incoming data to where the other of the receivers physically receives incoming data, the data transfer paths having a characteristic impedance that is largely constant during normal apparatus operation.

17. Apparatus as in claim 16 wherein the second data rate is greater than the first data rate.

18. Apparatus as in claim 17 further including:
   a first receive state machine that performs state functions on data received from the first receiver at the first data rate to produce further data;
   a second receive state machine that performs state functions on data received from the second receiver at the second data rate to produce further data; and
   selection circuitry that selectively passes further data either from the first state machine or from the second state machine.

19. Apparatus as in claim 17 further including:
   a further isolation transformer having a further primary winding and a further secondary winding, the connecting unit being electronically coupled to the further secondary winding and connectable to a pair of lines of a further twisted-pair cable so as to electronically couple the further twisted-pair cable to the further secondary winding;
   a first transmitter that differentially transmits outgoing data to the further primary winding largely at the first data rate; and
   a second transmitter that differentially transmits outgoing data to the further primary winding largely at the second data rate.

20. Apparatus as in claim 19 wherein:
   the data transfer paths along which the receivers receive incoming data extend in an electrically non-interruptible manner from the receive transformer to the receivers; and
   the transmitters transmit outgoing data along data transfer paths that extend in an electrically non-interruptible manner from the transmitters to the transmit transformer.

21. Electronic apparatus comprising:
   an isolation transformer having a primary winding and a secondary winding;
   a connecting unit electronically coupled to the primary winding and connectable to a pair of lines of a twisted-pair cable so as to electronically couple the twisted-pair cable to the primary winding;
   a first receiver that differentially receives incoming data from the secondary winding largely at a first data transfer rate; and
   a second receiver that differentially receives incoming data from the secondary winding largely at a second data transfer rate different from the first data rate, incoming data from the secondary winding being provided during normal apparatus operation along data transfer paths that in part extend in a non-switchable manner from where one of the receivers physically receives incoming data to where the other of the receivers physically receives incoming data.

22. Apparatus as in claim 21 wherein the second data rate is greater than the first data rate.

23. Electronic apparatus comprising:
   an isolation transformer having a primary winding and a secondary winding;
   a connecting unit electronically coupled to the secondary winding and connectable to a pair of lines of a twisted-pair cable so as to electronically couple the twisted-pair cable to the secondary winding;
   a first transmitter that low-pass filters digital data to produce outgoing data which the first transmitter differentially transmits to the primary winding substantially in accordance with the 10Base-T protocol; and
   a second transmitter that differentially transmits outgoing data to the primary winding substantially in accordance with the 100Base-TX protocol.

24. Apparatus as in claim 23 further including a transmit filter that low-pass filters outgoing data from the second transmitter at a frequency bandwidth greater than that of the first transmitter.

25. Apparatus as in claim 23 wherein the transmitters transmit outgoing data along data transfer paths that extend in an electrically non-interruptible manner from the transmitters to the primary winding.

26. Electronic apparatus comprising:

an isolation transformer having a primary winding and a secondary winding;

a connecting unit electronically coupled to the primary winding and connectable to a pair of lines of a twisted-pair cable so as to electronically couple the twisted-pair cable to the primary winding;

a first receiver that differentially receives incoming data from the secondary winding substantially in accordance with the 10Base-T protocol; and a second receiver that differentially receives incoming data from the secondary winding substantially in accordance with the 100Base-TX protocol, incoming data from the secondary winding being provided during normal apparatus operation along data transfer paths that extend from the secondary winding through where one of the receivers physically receives incoming data to where the other of the receivers physically receives incoming data, the data transfer paths having a characteristic impedance that is largely constant during normal apparatus operation.

27. Electronic apparatus comprising:

an isolation transformer having a primary winding and a secondary winding;

a first transmitter that low-pass filters digital data to produce outgoing data which the first transmitter differentially transmits to the primary winding largely at a first data transfer rate;

a second transmitter that differentially transmits outgoing data to the primary winding largely at a second data transfer rate different from the first data rate; and an optical transmitter electronically coupled to the secondary winding and connectable to an optical cable.

28. Apparatus as in claim 27 wherein the second data rate is greater than the first data rate.

29. Apparatus as in claim 28 further including a transmit filter that low-pass filters outgoing data from the second transmitter at a frequency bandwidth greater than that of the first transmitter.

30. Apparatus as in claim 28 wherein the transmitters transmit outgoing data along data transfer paths that extend in an electrically non-interruptible manner from the transmitters to the primary winding.

31. Electronic apparatus comprising:

an isolation transformer having a primary winding and a secondary winding;

a first receiver that differentially receives incoming data from the secondary winding largely at a first data transfer rate;

a second receiver that differentially receives incoming data from the secondary winding largely at a second data transfer rate different from the first data rate, incoming data from the secondary winding being provided along data transfer paths that extend from the secondary winding through where one of the receivers physically receives incoming data to where the other of the receivers physically receives incoming data, the data transfer paths having a characteristic impedance that is largely constant during normal apparatus operation; and an optical receiver electronically coupled to the primary winding and connectable to an optical cable.

32. Apparatus as in claim 31 wherein the second data rate is greater than the first data rate.

33. Electronic apparatus comprising:

an isolation transformer having a primary winding and a secondary winding;

a first transmitter that low-pass filters digital data to produce outgoing data which the first transmitter differentially transmits to the primary winding largely at a first data transfer rate;

a second transmitter that differentially transmits outgoing data to the primary winding largely at a second data transfer rate different from the first data rate; and means for providing outgoing data from the secondary winding to a communication cable.

34. Apparatus as in claim 33 wherein the second data rate is greater than the first data rate.

35. Apparatus as in claim 34 wherein the transmitters transmit outgoing data along data transfer paths that extend in an electrically non-interruptible manner from the transmitters to the primary winding.

36. Electronic apparatus comprising:

an isolation transformer having a primary winding and a secondary winding;

means for providing incoming data from a communication cable to the primary winding;

a first receiver that differentially receives incoming data from the secondary winding largely at a first data transfer rate; and a second receiver that differentially receives incoming data from the secondary winding largely at a second data transfer rate different from the first data rate, incoming data from the secondary winding being provided along data transfer paths that extend from the secondary winding through where one of the receivers physically receives incoming data to where the other of the receivers physically receives incoming data, the data transfer paths having a characteristic impedance that is largely constant during normal apparatus operation.

37. Apparatus as in claim 36 wherein the second data rate is greater than the first data rate.

38. Electronic apparatus comprising:

an electrical isolation device;

a first transmitter that low-pass filters digital data to produce outgoing data which the first transmitter differentially transmits to the isolation device largely at a first data transfer rate;

a second transmitter that differentially transmits outgoing data to the isolation device largely at a second data transfer rate different from the first data rate; and a transfer device that supplies data from the isolation device to a communication cable.

39. Apparatus as in claim 38 wherein the first transmitter contains a digital waveshaper that at least partially provides the low-pass filtering in the first transmitter.

40. Apparatus as in claim 38 wherein the second data rate is greater than the first data rate.

41. Apparatus as in claim 40 further including a transmit filter that low-pass filters outgoing data from the second transmitter at a frequency bandwidth greater than that of the first transmitter.

42. Apparatus as in claim 40 wherein the transmitters transmit outgoing data along data transfer paths that extend in an electrically non-interruptible manner from the transmitters to the isolation device.

* * * * *